United States Patent [19]

Halley

[11] 3,753,676
[45] Aug. 21, 1973

[54] WATER TREATMENT COMPOSITION INCLUDING SYNTHETIC WAX

[75] Inventor: James L. Halley, Fulton County, Ga.

[73] Assignee: Tesco Chemicals, Inc., Atlanta, Ga.

[22] Filed: Aug. 18, 1971

[21] Appl. No.: 172,923

[52] U.S. Cl. .................................. 71/67, 71/DIG. 1
[51] Int. Cl. ........................ A01n 9/00, A01n 11/00
[58] Field of Search ................... 71/67, DIG. 1, 66; 424/249, 149, 128

[56] References Cited
UNITED STATES PATENTS

| | | | |
|---|---|---|---|
| 2,819,995 | 1/1958 | Wassell | 424/343 |
| 3,130,124 | 4/1964 | Ferris et al. | 71/67 |
| 3,296,069 | 1/1967 | Kowalski | 71/67 |
| 3,342,674 | 9/1967 | Kowalski | 71/67 |
| 3,276,949 | 10/1966 | Robson et al. | 424/128 |
| 3,488,420 | 1/1970 | Keast et al. | 71/67 |

Primary Examiner—James O. Thomas, Jr.
Attorney—Harold D. Jones, Jr.

[57] ABSTRACT

A water treatment composition comprising a water soluble chlorine containing compound or blend of compounds, optionally cyanuric acid, a water insoluble fatty diamide synthetic wax, and optionally a molding lubricant is effective in inhibiting the growth of bacteria, algae and other plant life in water when the composition is blended together and shaped into dosage unit form. The composition maintains its configuration during exposure to water and retains undesirable insolubles, while permitting the leaching of chlorine from the unit by the action of water upon the composition.

3 Claims, No Drawings

WATER TREATMENT COMPOSITION INCLUDING SYNTHETIC WAX

The present invention relates to novel sanitizing and/or disinfecting water treatment compositions and the method of preparing such compositions. In addition, the present invention relates to water treatment compositions which controllably liberate active and/or available chlorine in aqueous solutions over periods of time without adding undesirable insoluble materials to the aqueous solution.

It has been common practice heretofore to treat bodies of water with chlorine to kill and inhibit the growth of bacteria, algae and other plant and animal life. In these treatments, active chlorine is released into the water to build up and maintain effective concentrations for producing the sought after biological effect on the undesirable plant and animal life. By active chlorine it is meant both pure chlorine in the liquid or gaseous forms and chlorine-containing compounds which produce the above mentioned biological effects.

In these treatments the active chlorine added to the body of water dissipates with the passage of time due to environmental effects. As a result, it is necessary to periodically replenish the active chlorine to maintain an effective concentration. Desirably, the replenishment should be accomplished in a continuous manner so that as the active chlorine dissipates it would be immediately replaced by a like fresh amount of active chlorine. In this manner not only would an effective concentration be continuously maintained but no widely fluctuating active chlorine concentrations would be encountered which, at times, might possibly produce such high concentrations as would render the body of water at least temporarily unusable. Furthermore, since the amount of active chlorine in the body of water never reaches excessive concentration the dissipation rate is kept at a low optimum value (the dissipation rate being directly dependent on the concentration).

Recently, metering devices have been developed for continuous dissemination of active chlorine into bodies of water. These devices employ shaped chlorine-liberating compositions wherein the active and/or available chlorine is initially chemically bound in the molecular structures of the compounds constituting the composition. Upon being added to an aqueous media the compounds gradually dissolve and liberate the active chlorine within the solution. Generally, the chlorine-liberating compounds are shaped into a solid dosage-unit form, such as an elongated rod or stick, for use in the metering devices. Continuous operation of the device is obtained by soaking the shaped concentration within a selected quantity of the body of water whereby the available chlorine is released in the quantity of water which is then in turn passed into the body of water being treated. The period of time in which the selected quantity of water is associated with the shaped composition determines the effective concentration of active chlorine in the body of water.

It will be understood that the efficiency and effectiveness of the operation of the above-described continuous metering devices is substantially dependent upon the characteristics of the shaped chlorine-liberating composition.

Since some of the shaped compositions often include undesirable insoluble materials such as calcium carbonate and calcium chloride, typically the dissolution of those water treatment compositions includes the addition of the undesirable materials into the body of water. Over a period of time the addition of these undesirable materials may reach a point that harmful concentrations of the materials are obtained within the body of liquid. Other shaped compositions dissolve in the supply of water so rapidly that it is difficult to achieve a slow dissolving rate for prolonged addition of the chlorine composition to the supply of water.

Thus, it is one object of the present invention to provide a shaped chlorine-liberating composition which may be efficiently and effectively used with continuous metering devices for disseminating active and/or available chlorine into bodies of water over relatively long periods of time without the addition of undesirable insoluble materials into the body of water.

Another object of the present invention is to provide a shaped chlorine-liberating composition for use with metering devices for continuously maintaining a sufficient concentration level of active and/or available chlorine in a body of water to kill and/or inhibit the growth of bacteria, algae and other plant life by supplying chlorine to the water from a composition which dissolves relatively slowly over a long period of time.

These and other objects and advantages of the present invention will be apparent to those skilled in the art from the following description.

According to the present invention, the novel chlorine-liberating composition is initially formulated by intimately and uniformly blending together the following compounds: a water soluble chlorine containing compound or blend of compounds; optionally cyanuric acid; a water insoluble wax and optionally a molding lubricant. When blending these ingredients, it is preferred that they be in a substantially dry form. A conventional solids blending apparatus may be employed in this procedure, and it is important to insure that the blending is uniform so tht the resulting composition blend has a uniform distribution of the compounds throughout its volume. In this manner the active chlorine content will be uniform throughout the composition blend.

The blended compositions may then be formed into the desired solid shapes for use in the continuous metering devices. Forming is accomplished by conventional pressure molding in the absence of heat wherein a variety of molding pressures may be employed.

The active and/or available chlorine of the composition blend is provided by a chlorine liberating compound such as an alkali metal or alkaline earth metal hypochlorite; dichloroisocyanuric acid; trichloroisocyanuric acid; a sodium or potassium salt of di- or trichlorocyanuric acid. While each of the metallic hypochlorites performs adequately, preferable results are achieved through the use of calcium hypochlorite and particularly superior results are obtained through the use of hydrated calcium hypochlorite.

The relative proportions of the individual chlorine compounds within the composition may vary only over a relatively limited range and still produce a shaped chlorine-liberating composition having the desirable characteristics as previously described. In particular, the quantity of chlorine compound or blend of compounds should range from about 78 percent to about 99.9 percent by weight of the total composition. It is pointed out, however, that for best results it is preferred to employ a quantity of chlorine compound or blend of compounds of from about 92 percent to about 96 percent by weight of the total weight of the shaped chlorine-liberating composition.

As previously mentioned, cyanuric acid is an optional component of the present composition. It is believed that the cyanuric acid serves to improve the solubility characteristics of the total formulation while also stabilizing the chlorine in the total supply of water. When employed it is found that suitable results are obtained when from 6 to 20 percent of the cyanuric acid is present within the total composition. Preferred results are obtained when from 9 to 15 percent by weight of cyanuric acid is employed and particularly preferred results are achieved when from 11 to 13 percent of cyanuric acid is employed. If cyanuric acid is a component of the total formulation, the weight percentage of the chlorine containing compound should be reduced to accomodate the weight percentage of cyanuric acid.

The third component of the shaped composition serves to retain insolubles within the body of the shaped dosage unit and comprises a water insoluble fatty diamide synthetic wax; superior results are obtained when the wax is a diamide derivative of stearic acid. Particularly superior and preferred results are obtained through the use of N,N'-ethylene bis stearamide. It has been found that the use of from about 0.1 percent to about 20 percent by weight of the wax, based on the total weight of the composition, produces suitable results, and that superior results are achieved through the use of about 4 percent to about 7 percent by weight of the wax.

Suitable results are obtained when the wax is employed in a powder form, i.e., a screen analysis as follows:

Screen Analysis,
| | |
|---|---|
| on 100 mesh, % | 3.2 |
| on 200 mesh, % | 24.4 |
| on 325 mesh, % | 36.5 |
| thru 325 mesh, % | 35.9 |

Particularly superior and preferred results are obtained when the wax is employed in a micro particle size form, i.e., a screen analysis as follows:

Screen Analysis,
| | |
|---|---|
| on 100 mesh, % | nil |
| on 200 mesh, % | nil |
| on 325 mesh, % | nil |
| thru 325 mesh, % | 100 |

The remaining component of the blend, namely the lubricant, is an optional component since under certain circumstances it may be omitted. The lubricant is a substantially inert ingredient with respect to the chlorine-liberating capability of the shaped compositions but it does serve as a lubricant to aid in the molding operations. It is desirable to maintain a percentage of this lubricant material in the shaped compound as low as possible consistent with its intended purpose. In this manner the shaped composition will have a higher content of active ingredients per unit weight and consequently a higher active and/or available chlorine content per unit weight. Generally, the amount of lubricant material present in the shaped compound ranges up to about 2 percent by weight based on the total weight of the composition; it is preferred that less than about 1 percent by weight be employed.

The lubricant material may be one of a metallic salt of an aliphatic carboxylic acid having at least 10 carbon atoms, or a glycol stearate such as monoglycerol stearate-low glycerine. By way of example, these lubricants include the alkali metal salts such as sodium, potassium and lithium salts, the alkaline earth metal salts such as calcium and barium salts, and zinc magnesium salts of fatty acids. However, the alkali metal oleates, palmitates and stearates and the like as well as the corresponding alkaline earth salts and the zinc and magnesium salts are particularly suitable with the calcium and sodium stearates and monoglycerol stearate being preferred. In addition, it has been found that in swimming pool applications, monoglycerol stearate and calcium stearate are most preferred.

The use of the shaped chlorine-liberating composition as described above provides a high active chlorine content per unit weight and therefore requires that only minor quantities need be added to the bodies of water over a period of time in order to maintain an effective concentration for inhibiting the growth of bacteria, algae, and other plant and animal life.

By increasing or decreasing the wax content within the ranges specified it is possible to decrease or increase the dissolution rate of the chlorine compound into water. An increase in wax content results in a decrease in solubility rate for the chlorine compound and a decrease in wax content results in an increase in solubility rate for the chlorine compound. Through adjustments to the wax content it is possible to prepare a dosage unit of material which will have a determinable dissolution rate.

EXAMPLE NO. 1

A chlorine-liberating composition comprising 94 parts by weight calcium hypochlorite, 5 parts by weight, N,N' ethylene bis stearamide synthetic wax and one part by weight monoglycerol stearate is intimately blended into a uniform mixture. This blended composition is then molded into one-pound cylindrical sticks of approximately 2 ¼ inches in diameter and approximately 4 ¾ inches in length.

One of these chlorine-liberating composition sticks is tested under simulated swimming pool conditions in a continuous metering device which soaks the cylindrical stick in a selected quantity of water for a determinable period of time to dissolve out the chlorine of the stick and leave the undesirable insolubles in the stick. After dissolution of all the chlorine, the stick may be removed from the metering device and replaced by a new stick containing more chlorine bearing materials.

After 24 hours of continuous operation it is found that the stick has supplied an effective quantity of chlorine to the treated water without the significant addition of undesirable insolubles to the water.

EXAMPLE NO. 2

A chlorine-liberating composition comprising 84 parts by weight calcium hypochlorite, 15 parts by weight synthetic wax and 1 part by weight calcium stearate is intimately blended and pressure molded into cylindrical 1-pound sticks of approximately 2 ¼ inches in diameter and approximately 4 ¾ inches in length as in Example No. 1.

One of these chlorine-liberating composition sticks is tested in a continuous metering device in the same manner as outlined in Example No. 1.

After 24 hours of continuous operation it is found that the stick has supplied an effective quantity of chlorine to the treated water without the significant addition of undesirable insolubles to the water.

EXAMPLE NO. 3

A chlorine-liberating composition comprising 94 parts by weight calcium hypochlorite and 6 parts by weight synthetic wax is intimately blended and pressure molded into cylindrical 1-pound sticks of approximately 2 ¼ inches in diameter and approximately 4 ¾ inches in length as in Example No. 1.

One of these chlorine-liberating composition sticks is tested in a continuous metering device in the same manner as outlined in Example No. 1.

After 24 hours of continuous operation it is found that acceptable results are obtained in the treatment for a supply of water.

EXAMPLE NO. 4

A chlorine-liberating composition comprising 98 parts by weight calcium hypochlorite, 1 part by weight synthetic wax, and 1 part by weight monoglycerol stearate-low glycerine is intimately blended and pressure molded into cylindrical 1-pound sticks of approximately 2 ¼ inches in diameter and approximately 4 ¾ inches in length as in Example No. 1.

One of these chlorine-liberating composition sticks is tested in a continuous metering device in the same manner as outlined in Example No. 1.

After 24 hours of continuous operation it is found that acceptable results are obtained.

EXAMPLE NO. 5

A chlorine-liberating composition comprising 94.5 parts by weight trichloroisocyanuric acid, 5 parts by weight N,N' ehtylene bis stearamide synthetic wax and 1 part by weight calcium stearate is intimately blended into a uniform mixture. The blended composition is then molded into 1-pound cylindrical sticks of approximately 2 ¼ inches in diameter and approximately 4 ¾ inches in length.

One of these chlorine-liberating composition sticks is tested in a continuous metering device in the same manner as outlined in Example No. 1. After 24 hours of continuous operation it is found that the stick has yielded chlorine to the supply of water at a relatively slow rate to produce a satisfactory concentration of chlorine in the supply of water.

EXAMPLE NO. 6

A chlorine-liberating composition comprising 81.5 parts by weight trichloroisocyanuric acid, 12 parts by weight cyanuric acid, 5 parts by weight N,N' ethylene bis stearamide synthetic wax and 1.5 parts by weight monoglycerol stearate-low glycerine is intimately blended and pressure molded into cylindrical one-pound sticks of approximately 2 ¼ inches in diameter and approximately 4 ¾ inches in length as in Example No. 1.

One of these chlorine-liberating composition sticks is tested in a continuous metering device in the same manner as outlined in Example No. 1. After 24 hours of continuous operation, it is found that the stick has yielded chlorine to the supply of water at a relatively slow rate to produce a satisfactory concentration of chlorine in the supply of water.

The above examples point out that the shaped chlorine-liberating compositions of the present invention are capable of continuously supplying chlorine at a reasonable rate into a body of water and maintaining a sufficient active chlorine concentration to kill and inhibit bacteria and algae growth in the water.

The size of the particles of the chlorine containing compounds and lubricant components used to prepare the chlorinating compositions of the present invention is deemed critical and has significant effect on the capabilities of the shaped composition, specifically the dissolution rate. The chlorine compound should be in a granular form and should pass through a No. 10 mesh U. S. Standard screen and preferably substantially all (at least about 90 percent) of the particles or granules should be retained on a No. 100 mesh U. S. Standard screen. The particle size of the particles of the lubricant material should be in the range of between about 1 to about 100 microns and preferably between about 1 and about 50 microns.

When mixing together the various components of the composition prior to compression into a shaped form, it is preferred that the wax component, the chlorine compound and the optional cyanuric acid component be thoroughly premixed prior to the addition of the optional lubricant material.

While the composition blends, in the above examples, have been formed into rod or stick-like shapes, other shapes and forms are also within the purview of the present invention. Specifically, such other forms include tablets which may be added directly to a supply of water wherein chlorine is dissolved slowly and directly into the supply and undesirable insolubles are retained within the tablet to be disposed of with disposition of the tablet after release of all the chlorine.

It is found that the solid formulations of the present invention have utility in the sanitization of such supplies of water as swimming pools, and potable water reservoirs. In addition, the present information may be used in the treatment of cooling tower water supplies and sewage streams.

While the present invention has been described in terms of specific compositions it is not intended to be so limited but is to include all equivalent compositions coming within the scope of the appended claims.

We claim:

1. Process for sanitizing a reservoir of water comprising subjecting portions of the water to a pressed composition comprising a uniform blend of from 78 to 99.9 percent by weight of a compound selected from the group consisting of an alkali metal hypochlorite, an alkaline earth metal hypochlorite, dichloroisocyanuric acid, trichloroisocyanuric acid, a sodium salt of dichlorocyanuric acid, a sodium salt of trichlorocyanuric acid, a potassium salt of dichlorocyanuric acid, and a potassium salt of trichlorocyanuric acid; from about 0.1 percent to about 20 percent by weight of a water insoluble wax; and from 0 to about 2 percent by weight of a molding lubricant; dissolving chlorine out of the composition without dissolving out undesirable materials of the composition; dispersing the chlorine within the portion of water; and then adding the portion of water to the reservoir of water.

2. Process for sanitizing a reservoir of water according to claim 1 wherein the composition also contains from 6 to 20 percent by weight of cyanuric acid.

3. Process for sanitizing a reservoir of water according to claim 1 wherein the water insoluble wax is N,N'-ethylene bis stearamide and the molding lubricant is selected from calcium stearate and monoglycerol stearate.

* * * * *